United States Patent [19]

Klein

[11] 3,961,116

[45] June 1, 1976

[54] NOVEL FLOCKED FABRIC

[75] Inventor: Charles Klein, Mexico City, Mexico

[73] Assignee: United Merchants and Manufacturers, Inc., New York, N.Y.

[22] Filed: May 27, 1975

[21] Appl. No.: 581,252

Related U.S. Application Data

[63] Continuation of Ser. No. 351,096, April 13, 1973, Pat. No. 3,903,331

[52] U.S. Cl. .................................. 428/90; 427/180; 427/195; 427/201

[51] Int. Cl.[2] ....................... B05D 1/14; B05D 1/16; B32B 33/00

[58] Field of Search .............. 428/90; 427/180, 195, 427/201

[56] References Cited

UNITED STATES PATENTS

| | | | |
|---|---|---|---|
| 2,887,400 | 5/1959 | Pollock | 428/90 |
| 3,365,727 | 1/1968 | Hoffman | 428/90 |
| 3,410,747 | 11/1968 | Orr | 428/90 |
| 3,822,174 | 7/1974 | Hefele | 428/90 |

*Primary Examiner*—Marion E. McCamish
*Attorney, Agent, or Firm*—Michael A. Caputo; John P. McGann

[57] ABSTRACT

A process for making a porous flocked fabric by coating one side of a loosely interlaced substrate with a flock binder. The coated side of the substrate is flocked and the binder is allowed to migrate or strike through to the opposite side of the substrate. A particulate material, e.g., flock, ground flock, talc, etc., is then applied to said opposite side and the binder is permanently set. The product obtained by this process is also described.

2 Claims, 3 Drawing Figures

NOVEL FLOCKED FABRIC

CROSS REFERENCE TO RELATED APPLICATIONS

This application is a continuation of copending application Ser. No. 351,096, filed on Apr. 13, 1973, now U.S. Pat. No. 3,903,331.

BACKGROUND OF THE INVENTION

1. Field of the Invention

This invention relates to the field of flocked or pile type fabrics. More particularly it concerns a fabric carrying raised fibers and having a highly porous structure.

2. Description of the Prior Art

Flocked fabrics and methods for preparing such have been known to the art for some time. One of the major disadvantages with such flocked fabrics is that they have found limited use because of their stiff hand and relative impermeability to gases and moisture.

Such fabrics normally comprise three layers, a backing fabric layer, an adhesive interlayer and a flocked layer of upstanding fibers. Because of the nature of the adhesive interlayer, i.e., the adhesive used spreads over the backing layer in a continuous film, this layer constitutes essentially a gas or moisture impermeable barrier. For this reason, flocked fabrics have heretofore only been used in relatively heavy fabrics in the apparel field.

Additionally, attempts to flock shear fabrics, particularly knits, to produce relatively permeable flocked fabrics have been unsuccessful because of the dimensional instability of such fabrics during the flocking process.

SUMMARY OF THE INVENTION

I have discovered a new type flocked fabric and a method for making same, which fabric is relatively porous and light and possesses a very soft velvet-like hand. Additionally, I have discovered a method for flocking relatively shear, woven or knitted fabrics, i.e., loosely interlaced fabrics, while avoiding the dimensional stability problems normally associated with such materials.

The flocked fabric of the present invention is prepared by coating one side of a loosely interlaced substrate with a flock binder or adhesive and then applying raised fibers, e.g., flock or pile, to the coated side of said substrate. Thereafter, the coated substrate is held for a sufficient time to allow the binder to migrate through the substrate to the opposite side thereof. A particulate material is then applied to the opposite side of the substrate whereby it is secured to the substrate by virtue of the migrated binder. Thereafter, the binder is permanently set.

The product obtained comprises a laminate having a backing layer of a loosely interlaced fabric which has a non-continuous, permeable coating of the binder thereon. The binder also permeates through the spaces of the backing layer. The laminate possesses a top layer of upstanding fibers, i.e., flock or pile, which is secured to the backing layer by the binder. The laminate further possesses a bottom layer of a particulate material which is secured to the backing layer by the binder.

By virtue of the foregoing described process, it will be seen that the product obtained does not have a continuous film or sheet of binder or adhesive thereon.

However, the binder is sufficiently dispersed or distributed on the backing layer such that a relatively uniform layer of raised fibers is adhered thereto. Additionally, the fabric remains porous because of the discontinuous nature of the adhesive or binder layer. This contributes both to the soft aesthetic hand of the fabric as well as the relative permeability thereof.

DESCRIPTION OF THE PREFERRED EMBODIMENT

Figure 1:
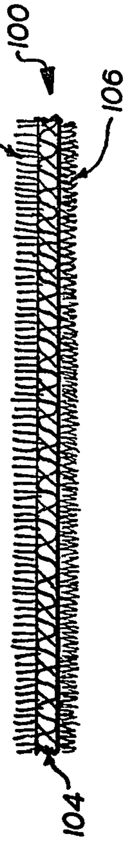
FIG. 1 is a cross-sectional view of the present invention.

Referring to FIG. 1, the laminate of the present invention is shown generally at 100. It comprises an upper layer of raised fibers 102, e.g., a flock or pile, secured to a backing layer or substrate of a loosely interlaced fabric 104. The raised fibers 102 are secured to the backing layer 104 by an adhesive binder which is disposed on the backing 104 in a non-continuous coating so as not to interfere with the air and moisture permeability of the laminate. It is understood, of course, that there must be sufficient binder disposed on the backing 104 to secure enough raised fibers to the fabric to give the desired density of the covering.

Additionally, the binder permeates through the backing 104 in order to secure a bottom layer of particulate material 106 to the back side of the backing layer 104.

As used herein, the term flock is intended to mean short fibers or filamentary material, generally less than one fourth inch in length, although flock of greater length is known and can be used.

The term pile fibers is generally intended to refer to a classification of upstanding fibers having somewhat longer length than flock, e.g., ½ to 2 or 3 inches in length. However, it is understood that any type of fibers or groups of fibers which are intended to be disposed in a substantially upright position and attached to a backing or support material by use of an adhesive binder can be used for the present invention.

As used herein, the term particulate material is intended to include flock fibers, ground flock or powdered fibers, or any other type of finely provided or granulated solid material which could suitably and desirably be secured to the bottom side of the substrate by the binder. Typically, for example, talc, sand, powdered rubber, etc., could be used, depending on the end use and aesthetic results contemplated.

Figure 2:
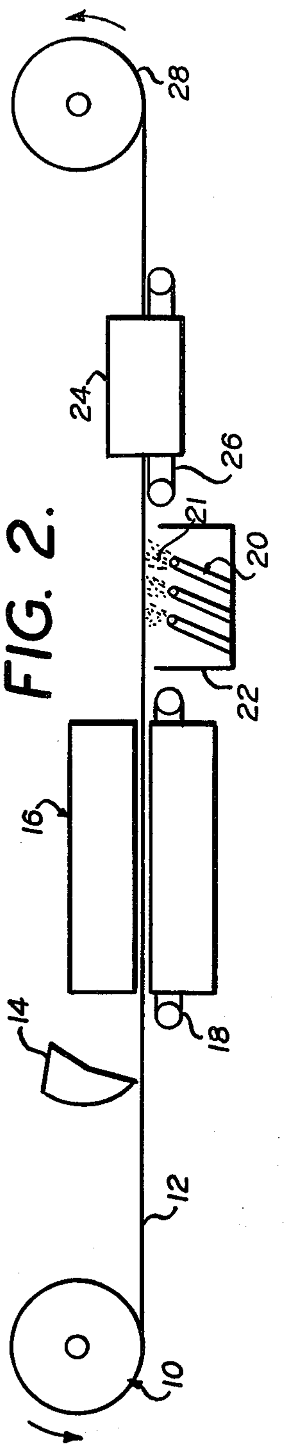
FIG. 2 is a schematic diagram of the process of the present invention.

Referring now to FIG. 2, the laminate of the present invention may be produced by first coating a substrate comprised of a loosely interlaced fabric 12 obtained from roll 10 with an adhesive binder applied with knife 14. Alternately, the adhesive may be applied with a roll, stipple roller, and other conventional methods well known in the art. The textile fabric used as the substrate may be woven, non-woven, knitted, etc. Preferably, the fabric should be a relatively loosely interlaced material such that strike through of the binder can occur. Typical examples of such a material would be a light weight knitted fabric such as a ninon, nylon tricot, batiste, chiffon, chiffonette, and marquisette. Also single or double knitted fabrics, including nylon tricot ranging in weight from about 12 to 20 yards per pound (54 inch width) can be used.

After application of the flock binder or adhesive, the coated substrate is conveyed by conveyor 18 through flocking box 16. Flocking box 16 is a conventional type flocker as is well known in the art. Thus, it can be either of the electrostatic or beater bar type. The production of flocked fabrics by such methods are well known in the art (see for example U.S. Pat. No. 3,079,212, incorporated herein by reference).

As will be discussed hereinafter, subsequent to the application of the coating and during the travel of the substrate through the flocking box, a portion of the binder migrates through to the opposite side of the fabric substrate. Depending on the nature of the binder, it will require a certain amount of time to accomplish this migration or strike-through. It is often possible to force the binder through the fabric merely by using the coating knife. Ordinarily, it is a relatively short amount of time such that by the time substrate 12 reaches the deposition step as hereinafter described, the strike-through has been accomplished. It might be necessary, in certain instances, to build into the process an additional lag time, i.e., in addition to the time which it takes the substrate to go through flocking box 16, in order to achieve the strike-through. Whether or not this is necessary, as well as the appropriate strike-through times, are easily determined for any given substrate or adhesive binder.

After passing through flocking box 16, the substrate 12 is passed over a means for depositing a particulate material as defined hereinabove to the bottom side thereof. As shown in FIG. 2, this means typically may comprise a series of jets 20 for blowing or directing the particulate material 21 against the bottom side of substrate 12. A chamber 22 is shown for retrieving any particulate material which fails to adhere to the bottom side of the substrate.

After deposition of the particulate material, the substrate is then conveyed through a curing chamber 24 of the type normally used in the art. Depending on the nature of the adhesive, curing may be effected by heat or by ultra-violet or other ionizing type radiation. Thereafter, the substrate is conveyed onto wind up roll 28.

The flock binder which is used may be any type of curable adhesive normally used for flocking purposes or which is suitable for adhering raised fibers to a fabric substrate. Such adhesives may be foamed or unfoamed as is well known in the art.

Typically, such adhesives are generally classified as water base, solvent base adhesives or curable liquid systems.

Water base adhesives consist of a binder, generally an emulsion polymer, and a viscosity builder. They may also contain plasticizers, thermosetting resins, curing catalysts, stabilizers and other additives well known in the art.

The emulsion polymers generally used include acrylic, vinyl-acrylic, vinyl, urethane and styrene-butadiene latexes. In order that the flock be held in a desired position until the adhesive is fully cured, it is generally necessary to raise the viscosity of the latex to about 300 to 300,000 centipoises. The viscosity is dictated by the particular backing being used and the specific adhesive. Thus, for example, in the present invention, the adhesive must migrate or strike-through the porous fabric and contact the particulate material which is applied to the back side of the substrate. If the adhesive is too viscous, it will not do this. On the other hand, if the binder is not sufficiently viscous, too much strike-through will occur. This, of course, can create difficulties with respect to processing as well as undesirable product properties. Generally, adhesives having a viscosity in the range from about 10,000 to 500,000 centipoises is sufficient.

When a foamed adhesive is to be used, the viscosity is generally in the range less than about 3000 centipoises as determined by the Brookfield method with spindle No. 6 at 4 r.p.m. Blow up-ratios for such adhesives are generally in the range from about 1:2 to 1:10, and preferably from 1:2 to 1:5. Methods for forming adhesives for this use are well known in the art, see for example, U.S. Pat. No. 3,607,341, incorporated herein by reference.

Suitable thickeners for use to build viscosity include water soluble polymers, such as carboxymethyl cellulose, hydroxyethyl cellulose, polyoxyethylenes and natural gums as well as alkyl swellable polymers, such as, highly carboxylated acrylic emulsion polymers.

Plasticizers may be added to alter the hand of the finished goods or to improve the flow and levelling characteristics of the adhesives. Where the primary goal is the latter, fugitive plasticizers, such as, the phthalate esters may be employed.

Thermosetting resins such as methylol-melamines, ureaformaldehyde condensates or phenol formaldehyde condensates may be incorporated to improve durability or abrasion resistance of the finished goods.

Catalysts such as oxalic acid diammonium phosphate can be used to increase the rate of cure of the adhesive.

More specialized additives include ultra-violet absorbers.

Solvent adhesives include both fully reacted soluble polymers, such as, acrylic homo and co-polymers, polyesters, polyamides, or polyurethanes and two package systems such as, polyester polyols with diisocyanates or isocyanate prepolymers and epoxies with polyamines. The polymer or pre-polymer is dissolved in a suitable solvent which is preferably low boiling, and then thickened to the proper viscosity in a manner similar to that used for the water-base adhesives. Catalysts, cross-linking agents, stabilizers, pigments, or dyes may also be incorporated.

Curable liquid systems include two-part urethanes, e.g., a diisocyanate and a polymeric polyol, flexible epoxy systems, e.g., liquid epoxy resins or solutions of solid epoxy resins coreacted with polyamides or polyamines and dimercaptans and a polyene with a peroxide. Also, hot melts can be used, such as, polyethylene-vinyl acetate copolymer, polyethylene-ethylacrylate copolymer, and plasticized polyvinylchloride in the form of a plastisol which can be heated to fuse and then cured.

Figure 3:
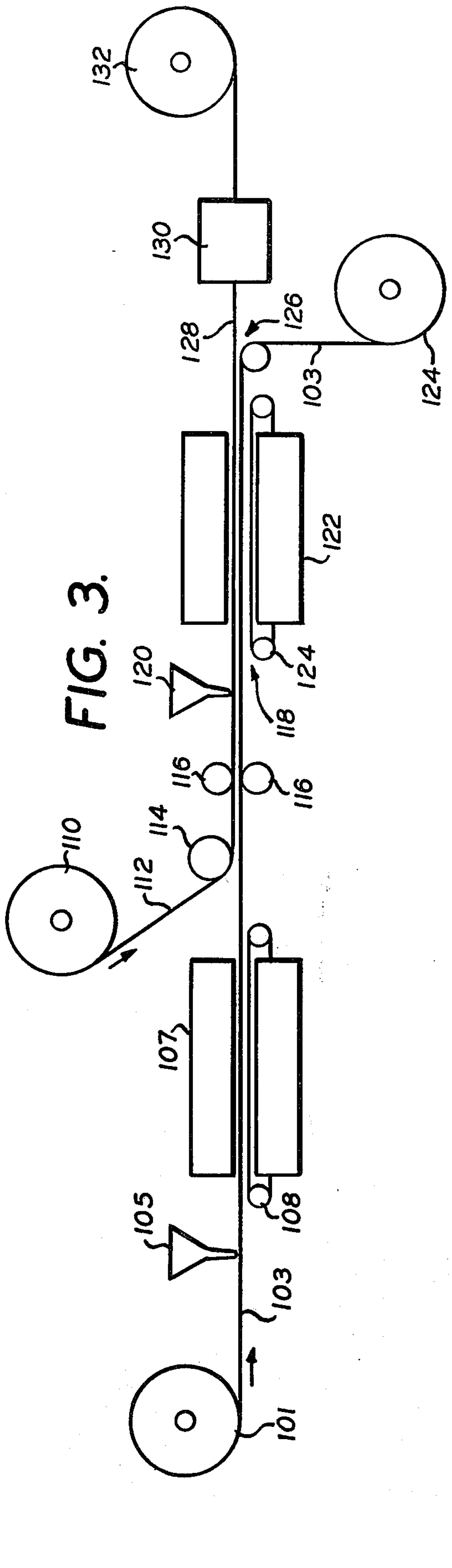
FIG. 3 is a schematic diagram of yet another embodiment of the process of the present invention.

As noted above, the general concept of the present invention contemplates the adherence of a bottom layer of particulate material to a loosely interlace structure carrying raised fibers as a top layer by virtue of the migration or strike-through of adhesive through the substrate. It is understood, of course, that many methods for applying the bottom layer of particulate material to the substrate having the migrated binder or adhesive therein will be apparent to the skilled art worker. In FIG. 3, a preferred method of such application is shown.

As shown therein, a support sheet 103 obtained from roll 101 is coated with a first adhesive binder applied with knife 105. Supporting sheet 103 may be any type of sheet material which is suitable for use on a temporary basis and which is relatively inexpensive inasmuch as it usually may only be used once and then disposed of. Typically, sheet 103 may be paper, plastic, fabric, etc. Other supporting sheets, e.g., a back cloth, a "back grey" as used in roller printing, etc., which are suitable for reuse can be used. It is important, however, that sheet 103 be capable of withstanding the various flocking and heating treatments used in the present process.

The first adhesive material may be any type of flock binder known to the art which is suitable for binding the flock to the supporting sheet on a temporary basis. Typically, such a binder material would be an adhesive composition or one which possesses minimal adhesive properties. Thus, for example, it is possible merely to use a wax diluted or dissolved in a suitable solvent such that it can be applied in a thin film to the paper. The wax merely serves to retain flock on the paper in a relatively loose form, but to hold it sufficiently such that it is not flown off in the flocking box. Thus, the flock which is contacted with the paper remains thereon for a relatively short time, i.e., until it reaches the second flocking step 122 which will be hereinafter described.

As used herein, the term uncurable adhesive composition means a composition which when subjected to the usual curing conditions, e.g., heat, ultra-violet, etc., will not permanently set or adhere to the substrate.

Also, typical of such compositions are low molecular weight polyethylene, polystyrene and the like. Additionally, starched based adhesives, such as, canary dextron and British Gum: gums, such as gum arabic and gum tragacanth; water soluble, non-curing polymers, such as, the polyvinyl alcohols, particularly hydrolyzed polyvinyl acetate, etc.; may be used. Another example of such a composition is glycerin and urea.

It is also possible, if desired, to use a curable adhesive for the supporting sheet. However, this can only be used when the laydown of the adhesive is minimal. That is to say, only a sufficient thickness of adhesive is placed on the supporting sheet so as to secure a minimum amount of particulate material, as hereinafter described, to the sheet. What actually occurs when such a curable adhesive is used is that the minimal amount of particulate material which is secured to the adhesive, itself, serves to further temporarily adhere the particulate material which is adjacent to or on top of it. This latter particulate material, inasmuch as it is not in actual contact with the adhesive, can be removed from the supporting sheet in the manner as hereinafter described.

Typically, a low solids neoprene solution (2–3%), low solids acrylic in solvent form, sodium alginate thickeners, etc., can be used as the temporary binder.

After application of the first binder, the coated supporting sheet 103 is conveyed by conveyor 108 through flocking box 107. Flocking box 107 is a conventional type flocker as is well known in the art. Thus it can be either of the electrostatic or beater bar type.

After exiting flocking box 107, the flocked paper is married to a loosely interlaced fabric 112 such as is described above in connection with FIG. 2.

Fabric 112 is delivered from roll 110 past a positioning roll 114 and then passes together with supporting sheet 103 through rolls 116. The rolls 116 do not exert any substantial pressure on the laminate, but are simply sufficiently close together to maintain the fabric and the supporting sheet substantially next to one another.

Thereafter, laminate 118 is coated on the fabric side with a second flock binder by knife 120. It is important that the second flock binder possess a greater affinity for the flock than the first flock binder. Thus, while it is the purpose of the first flock binder to merely retain the flock on the supporting sheet in order to carry it through the process, it is the purpose of the second flock binder to be later cured so as to secure the flock or raised fibers permanently to the fabric. Additionally, as will be seen hereinafter, the flock binder applied with knife 120 also serves to secure flock picked up from supporting sheet 103 to the back side fo fabric 112. The second flock binder is a curable flock adhesive, and is the same material as described herein in connection with FIG. 2.

After being coated with the second flock binder, the laminate 118 is passed through flocking box 122 using conveyor 124. Again, this flocking step is typical of flocking methods well known to the art. After exiting flocking box 122, at point 126, the supporting sheet 102 is separated from the flocked fabric 128. As shown, supporting sheet 103 is then rolled up on roll 124 for disposal or possible reuse.

During the time that it takes the laminate 118 to travel from the point of application of the second flock binder at knife 120 through flocking box 122 to the point of separation of the two sheets 126, the second flock binder migrates or strikes-through to the opposite side of fabric 112. The bottom side of fabric 112 is, of course, in direct contact with the particulate material which is on supporting sheet 103. Accordingly, this particulate material will be picked up and secured to the bottom side of fabric 112 by the migrated binder. It is easily within the skill of the operator of the process to adjust the travel speeds to assure that sufficient strike through occurs during this period to secure the desired amount of particulate material onto the bottom side of fabric 118. Understandably, the exact time required depends on a number of factors, e.g., the adhesive binder used, the density of the loosely interlaced fabric, etc.

After the separation of the 2 sheets at point 128, the fabric 128 which is now flocked or carries raised fibers on the upper side and carries the particulate material on the bottom side enters curing box 130. Again, this particular curing step can be any type as is well known in the art, e.g., heating, ultra-violet, etc. After exiting curing box 130, the finished sheet is rolled up onto roll 132.

If desired, it is not necessary that the supporting sheet 102 be separated from fabric 128 at point 126, i.e., prior to curing step 130. Thus, it is possible, when the appropriate adhesive binders are used, i.e., wherein the first adhesive binder is non-curable, that the laminate with the raised fibers and the particulate material thereon can be processed through curing box 130 and thereafter the supporting sheet 103 may be separated from the fabric layer 128. This latter procedure, i.e., separation after curing, is preferred for those second binders which are relatively slow drying, e.g., aqueous foamed and non-foamed systems.

It may be further desirable, to insert various finishing steps or treatment subsequent to curing step 130, e.g., scouring, resin, finishing, and the like, which processes and methods are well known and conventional in the art.

It should be further understood, that while for purposes of illustration, FIG. 3 has included a flocking box 107 for application of the particulate material, in this case flock, to support sheet 103, this particulate material may be applied in other ways.

Thus, for example, if the particulate material is talc, sand or some other type of material which is not suitably applied by a flocking type method, other means, e.g., air jets and the like may be employed. The particular method of application of the particulate material obviously is not critical to the final result of the present invention.

The following examples serve to illustrate the invention: In the examples, the strike-through of the fabric was effected by the mechanical action during the coating process whereby the binder was squeezed through the interstices of the substrate.

EXAMPLE 1

A heavy-weight paper was coated with gum Arabic having a viscosity of 80,000 cps and was then flocked with ground cotton on a beater bar flocking unit. The flocked paper was dried at 100°C. for 10 minutes.

Nylon tricot was placed on top of the flocked paper and coated with a foamed aqueous-based acrylic. The acrylic to air ratio was 1:3 and the wet lay-down was 10 mil. The coated nylon tricot still in contact with the flocked paper was flocked with a three-fourths mm rayon flock on a beater bar flocking unit and was then dried for 20 minutes at 60°C and cured for 15 minutes at 150°C. Finally, the paper was separated from the nylon substrate.

The resulting substrate was porous and permeable to air and possessed a bottom and top layer of flock.

EXAMPLE 2

Rayon challis was coated with a starch paste having a viscosity of 200,000 cps to a wet lay-down of 5 mil. The coated substrate was flocked with ground cotton on a beater bar flocking unit and dried at 100°C. for 10 minutes.

A sample of polyester ninon was placed on top of the flocked rayon substrate in such a way that the ground cotton faced the back side of the ninon. The top side of the ninon was coated with a high-viscosity, non-foamed acrylic bonder. The ninon was flocked with a 1 mm rayon flock while in contact with the rayon substrate and was then dried for 20 minutes at 60°C and cured for 10 minutes at 150°C. Finally, the rayon substrate was separated from the ninon.

The resulting substrate possessed a top surface comprising a 1 mm rayon flock and a back surface comprising a ground cotton pile.

EXAMPLE 3

A nylon non-woven was placed on top of a paper substrate which was temporarily flocked with ground cotton in such a way that the ground cotton on the paper contacted the back side of the non-woven. The top side of the non-woven was coated with a solvent-based adhesive to a wet lay-down of 5 mil. The coated non-woven, now bonded to the flocked paper, was flocked with a 1 mm rayon flock and was then cured for 5 minutes at 150°C. Finally, the paper was separated from the non-woven.

The resulting non-woven possessed a pile on both sides.

EXAMPLE 4

A sample of a nylon non-woven was coated with a sorbitol solution which was thickened to a viscosity of 30,000 cps to a wet lay-down of 3 mil. The coated sample was uniformly covered with talcum powder by means of a flour sifter and was then dried for 20 minutes at 60°C.

A sample of nylon tricot was placed on top of the talcumcovered non-woven in such a way that the talcum surface faced the back side of the nylon substrate. The front side of the nylon was coated with a solvent-based adhesive to a wet-lay down of 5 mil and was then flocked with a three-fourths mm rayon flock on the beater bar flocking unit. The laminate was dried at 60°C. for 20 minutes. Finally, the non-woven was separated from the tricot.

The resulting substrate possessed a pile on the front side and a thin layer of talcum on the back side.

Variations, can, of course, be made without departing from the spirit and scope of the invention.

Having thus described my invention, what I desire to secure and claim by Letters Patent is;

1. An air permeable flock fabric comprising:

a. a backing layer of a loosely interlaced fabric having a non-continuous, permeable coating of an adhesive binder thereon which permeates the spaces therein;

b. a substantially continuous top layer of upstanding flock fibers secured to the fabric by said binder; and c. a substantially continuous bottom layer of flock fibers secured to said backing layer by said binder

2. The fabric of claim 1 wherein the raised fibers are in the form of flock or pile, the backing layer is a knitted woven, or non-woven fabric.

* * * * *